UNITED STATES PATENT OFFICE.

GEORGES DE LAIRE, OF PARIS, FRANCE.

PROCESS OF MAKING ISOEUGENOL.

SPECIFICATION forming part of Letters Patent No. 457,863, dated August 18, 1891.

Application filed December 3, 1890. Serial No. 373,429. (No specimens.) Patented in England November 1, 1890, No. 17,547.

*To all whom it may concern:*

Be it known that I, GEORGES DE LAIRE, a citizen of the French Republic, residing in Paris, France, have invented an Improved Method of Preparing Isoeugenol from Eugenol, (for which a patent has been granted in Great Britain, No. 17,547, dated November 1, 1890,) of which the following is a specification.

My invention relates to the preparation of isoeugenol direct from eugenol or essence of cloves, the product being destined, primarily, for utilization in the production of vanillin. This conversion or utilization of the isoeugenol has, however, nothing to do with my present application.

I will proceed to explain how I carry out my invention in practice. Isoeugenol

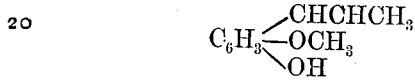

was obtained for the first time by Messieurs Tiemann and Kraaz as a product of homoferulic acid; but this acid can only be obtained synthetically from vanillin, and it naturally follows that it cannot be employed as a basis for an industrial preparation of isoeugenol. The endeavors to obtain directly isoeugenol by means of the process which allows of the transformation of safrol into isosafrol have not given practical results, as shown by the recent publications of Messrs. Ciamician and Eyckmann.

The process which constitutes the present invention allows of the ready preparation of the isoeugenol by means of eugenol or the essence of cloves, a substance which is readily obtained in commerce.

In carrying out my invention I proceed as follows: I take about five hundred grams of eugenol, about twelve hundred and fifty grams of hydrate of potassa, and about two thousand five hundred grams of alcohol. These are heated to the boiling-point in an apparatus provided with a cohobater. The duration of the heating should be from sixteen to twenty-four hours, at the end of which time the reaction will be complete. The alcohol—preferably amylic alcohol—will now be driven off by means of a current of steam, and the isoeugenol separated by treating the mass with dilute sulphuric or hydric-chloro acid. The isoeugenol separates from the mass as an oily substance, which may be collected by decantation. After having been thoroughly washed it is submitted to distillation for purification. It boils at from 252° to 262° centigrade.

As before stated, the isoeugenol may be utilized for the production of vanillin, and it may also be employed as a perfume.

Having thus described my invention, I claim—

The herein-described method of preparing isoeugenol, which consists in first heating eugenol or essence of cloves, combined with hydrate of potassa and alcohol in about the proportions specified, until a reaction is effected, then expelling the alcohol with steam, and then treating the mass with acid, as described, in order to separate the isoeugenol therefrom, as set forth.

In witness whereof I have hereunto signed my name in the presence of two subscribing witnesses.

GEORGES DE LAIRE.

Witnesses:
J. ARMENGAUD, Jeune,
R. M. HOOPER.